United States Patent [19]
Itoh et al.

[11] Patent Number: 4,719,618
[45] Date of Patent: Jan. 12, 1988

[54] DIGITAL CONFERENCE CIRCUIT

[75] Inventors: Yasuo Itoh; Yuisuke Maruyama, both of Tokyo, Japan

[73] Assignee: NEC Corporation, Tokyo, Japan

[21] Appl. No.: 737,000

[22] Filed: May 23, 1985

[30] Foreign Application Priority Data

May 25, 1984 [JP] Japan ................................ 59-105752

[51] Int. Cl.$^4$ .............................................. H04J 3/02
[52] U.S. Cl. ..................................................... 370/62
[58] Field of Search ..................... 370/62; 179/18 BC; 379/202

[56] References Cited

U.S. PATENT DOCUMENTS 4,224,688 9/1980 Ciancibello et al. .................. 370/62
4,280,216 7/1981 Zeitrag .................................. 370/62

*Primary Examiner*—Douglas W. Olms
*Attorney, Agent, or Firm*—Sughrue, Mion, Zinn, Macpeak & Seas

[57] ABSTRACT

A digital conference circuit for multiplexed voice signals. Each slot for each of the users is further subdivided into sub-slots for all the users. A selection circuit indicates which originating users are to be connected with which receiving users within a conference. No message is retransmitted to the originator. The received message in a slot is gated according to the selection signal into an adder, also receiving the output of a shift register holding the signals for all sub-slots in one slot. The added signal is shifted into the shift register. Once all the corresponding sub-slots have been added, the output of the shift register is transmitted to the users.

3 Claims, 27 Drawing Figures

FIG.1
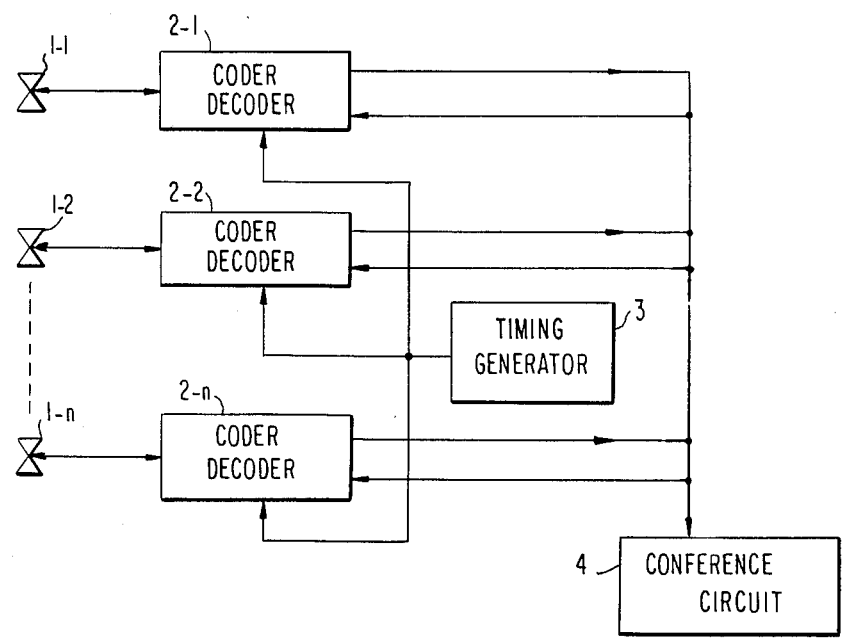
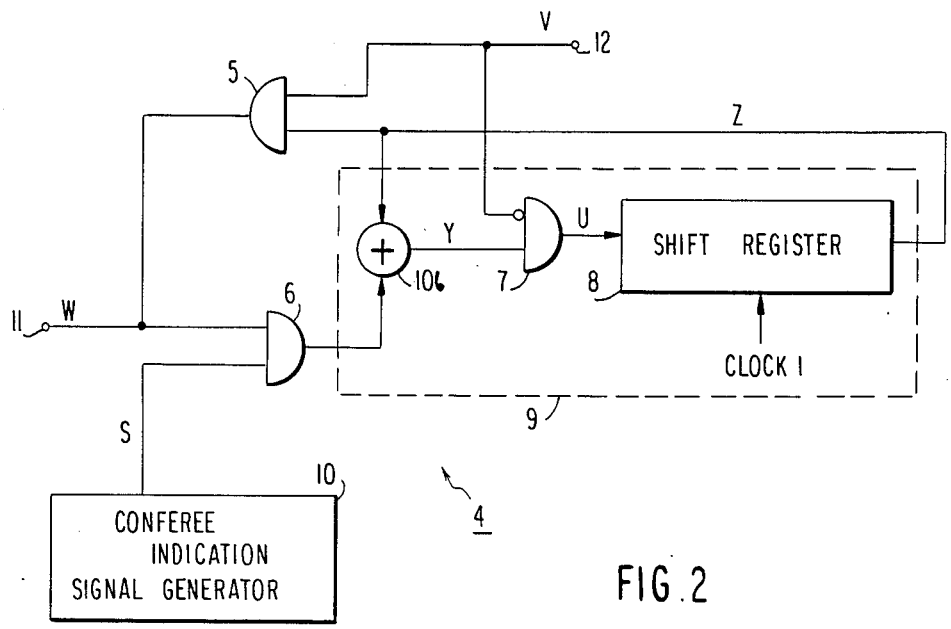
FIG.2

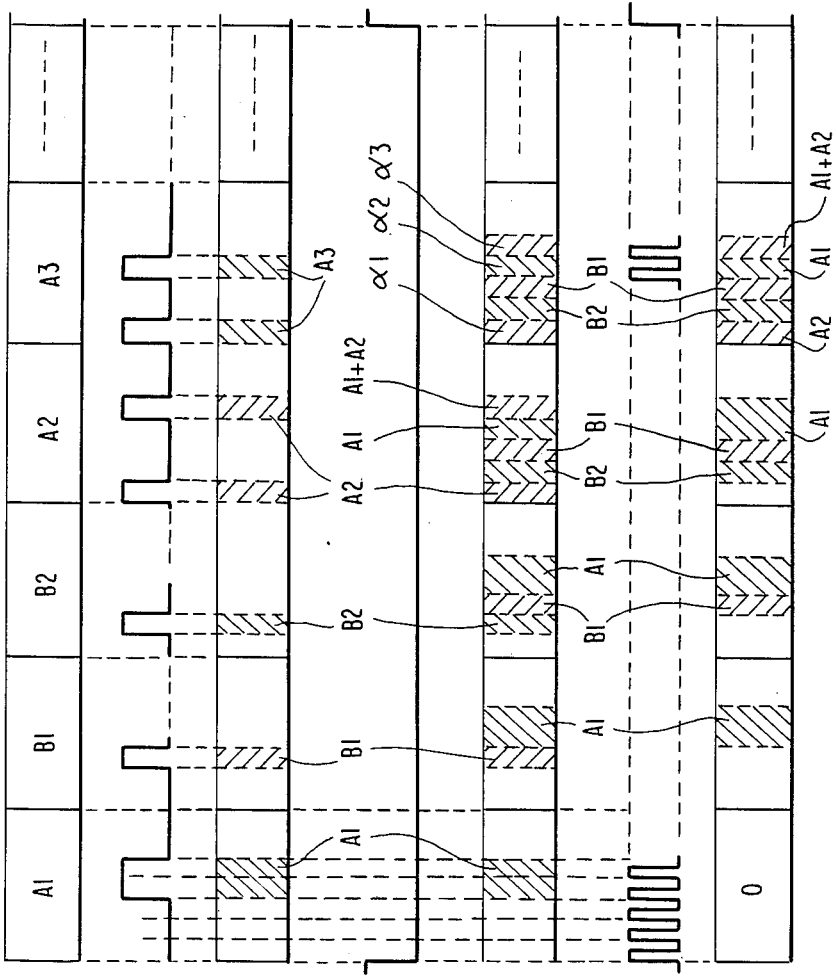
FIG.3A TIME SLOT
FIG.3B INPUT SIGNAL W
FIG.3C CONFEREE INDICATION SIGNAL S
FIG.3D OUTPUT X OF GATE 6
FIG.3E T/R CHANGE SIGNAL V
FIG.3F OUTPUT U OF GATE 7
FIG.3G CLOCK 1
FIG.3H OUTPUT Z OF SHIFT REGISTER 8

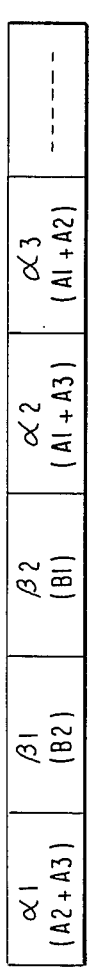
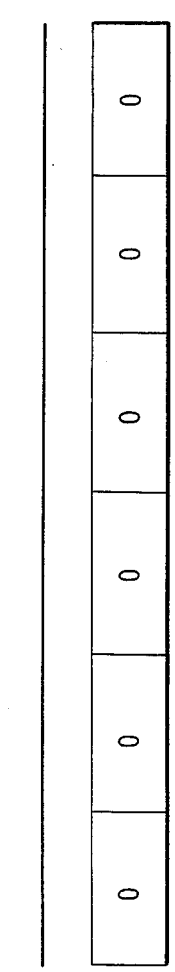
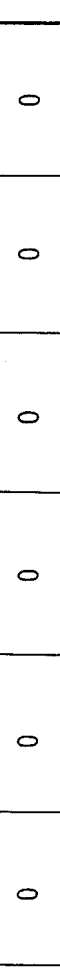
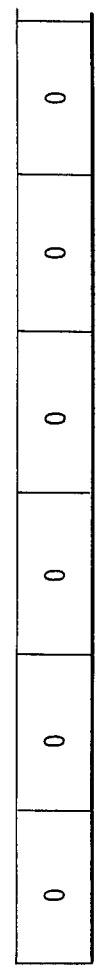
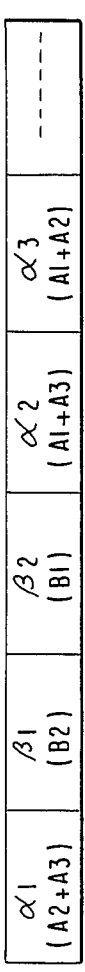
FIG. 4A TIME SLOT
FIG. 4B OUTPUT SIGNAL
FIG. 4C CONFEREE INDICATION SIGNAL S
FIG. 4D OUTPUT X OF GATE 6
FIG. 4E T/R CHANGE SIGNAL V
FIG. 4F OUTPUT U OF GATE 7
FIG. 4G CLOCK 1
FIG. 4H OUTPUT Z OF SHIFT REGISTER 8

| | | SWITCH BOARD | | | | |
|---|---|---|---|---|---|---|
| | | CHANNEL No. | | | | |
| | | 1 | 2 | 3 | 4 | 5 |
| CONFERENCE No. | A | ON | OFF | OFF | ON | ON |
| | B | OFF | ON | ON | OFF | OFF |
| | C | OFF | OFF | OFF | OFF | OFF |

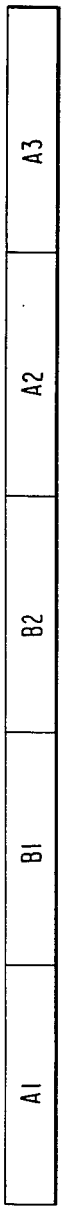
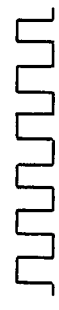
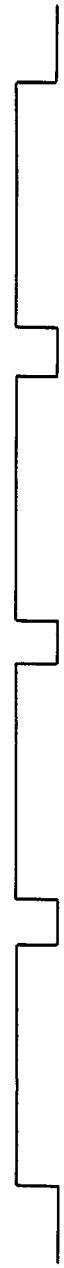
FIG.7A TIME SLOT
FIG.7B INPUT SIGNAL
FIG.7C CLOCK 2
FIG.7D CLOCK 3
FIG.7E OUTPUT OF GATE
FIG.7F CONTROL SIGNAL
FIG.7G CONFEREE INDICATION SIGNAL

DIGITAL CONFERENCE CIRCUIT

BACKGROUND OF THE INVENTION

This invention relates to a telephone conference circuit using digital techniques.

A telephone conference circuit provides conferencing by summing all the voice signals of plural conferees and transmitting the resultant signal to the conferees. In order to prevent the voice of a talker from being transmitted back to himself, the voice signal of the talker is excluded when summing up all the voice signals from the other conferees to produce a conference voice signal. One example of such a conference circuit is shown in U.S. Pat. No. 4,224,688 issued on Sept. 23, 1980 to Carmine A. Ciancibello et al. However, since the circuit proposed therein needs an input and an output terminals separately, the number of necessary wires becomes large to make the system bulky as well as costly.

SUMMARY OF THE INVENTION

An object of this invention is, therefore, to provide a digital conference circuit capable of commonly using one terminal as an input terminal and an output terminal.

According to one aspect of the present invention, there is provided a digital conference circuit which enables the holding of at least one conference by summing up the voice signals from all the conferees other than the talker to produce a conference voice signal and supplying the conference voice signal to all the conferees. The conference circuit comprises first means for generating a conferee indication signal to indicate a combination of conferees, second means responsive to the indication signal for producing an addition signal to be added to the voice signal of each conferee from a multiplexed PCM signal obtained by multiplexing the voice signals of the conferees, third means for summing up the addition signal to produce the conference voice signal, and fourth means for transmitting the conference voice signal to all the conferees.

BRIEF DESCRIPTION OF THE DRAWINGS

The invention now will be described in more detail with reference to the accompanying drawings wherein:

FIG. 1 is a block diagram of a telephone conference system to which the invention is applied;

FIG. 2 is a circuit diagram of an embodiment of the invention;

FIGS. 3A to 3H and 4A to 4H are waveforms for describing the operation of the conference circuit;

FIG. 5 is a circuit diagram of a conferee indication signal generator for use in the invention; and FIG. 6 and 7A to 7G are a table and time charts for explaining the operation of the conference indication signal generator. The same reference numerals denote the same structural elements in the various drawings. The thin lines are used for either input or output of an analog signal or a bit serial signal.

DESCRIPTION OF THE PREFERRED EMBODIMENT

Figures 5, 6:
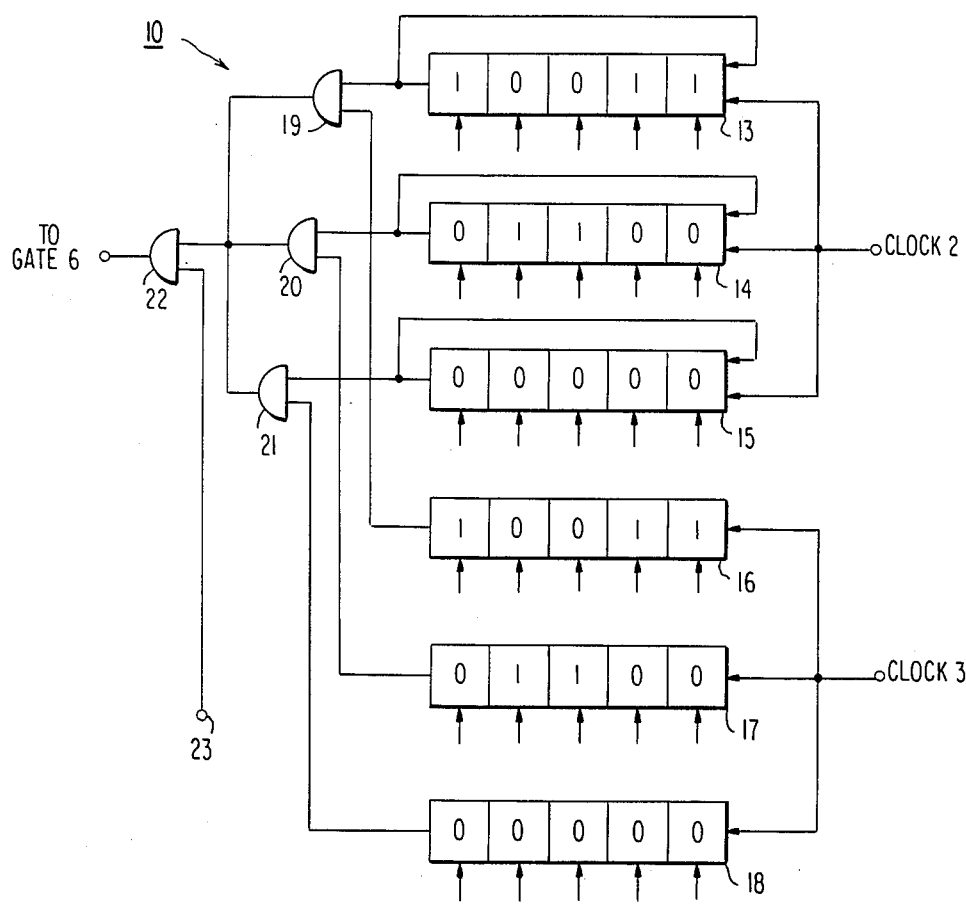

Referring to FIG. 1, coder and decoders (CODECs) 2-1 through 2-$n$ pulse-code modulate (PCM) voice signals supplied from telephones 1-1 through 1-$n$ to obtain PCM words, respectively, and transmit each of the PCM words to a conference circuit 4 during an allotted time slot in response to a timing signal given from a timing generator 3. The conference circuit 4 receives a multiplexed PCM signal obtained by time-division multiplexing the PCM words from CODECs 2-1 through 2-$n$, sums the PCM words in a prescribed addition procedure, and sends the PCM multiplexed signal to the CODECs 2-1 through 2-$n$. Unlike the conventional circuit described in U.S. Pat. No. 4,224,688, input and output terminals are used in common in the present conference circuit 4.

Referring to FIG. 2, one embodiment of the invention comprises a conferee indication signal generator 10 and an AND gate 6 gates by an indication signal S fed from the generator 10 to pass as an addition signal X part of the multiplexed PCM signal W. The addition signal x will be added to the signals of other channels or conferees. The embodiment also comprises an addition circuit 9 which sequentially sums different parts of the addition signal X to produce a conference voice signal Z. An AND gate 5 responsive to a transmission indication signal V supplied to a terminal 12 causes the transmission of the conference voice signal Z. The addition circuit 9 is made up of an adder 10$b$ which adds the conference voice signal Z to the adding signal X, an AND gate 7 responsive to the transmission indication signal V to produce a partial addition signal U from the output of the adder 10$b$, and a shift register 8 which sequentially shifts the partial addition signal U, in response to a clock signal 1, to produce the conference voice signal Z.

The operation of the embodiment will now be described in conjunction with FIGS. 2, 3A to 3H and 4A to 4H. It should be noted that in the description stated hereinafter, PCM words $A_1$, $A_2$, $A_3$, $B_1$ and $B_2$ also denote either conferees or channels $A_1$, $A_2$, $A_3$, $B_1$ and $B_2$. Description will be given to a case wherein conferee's PCM words $B_1$ and $B_2$ of the second conference group are interposed among time slots assigned to the conferee's PCM words $A_1$, $A_2$ and $A_3$ of the first conference group. Before proceeding to the description of the operation, the signals W, V and S will be explained. The signal W comprises a first frame (receiving frame) of T/2 (T being a sampling period) length wherein the PCM words fed from the CODECs 2-1 through 2-N are time-division multiplexed, and a second frame (transmitting frame) of T/2 length which is to be transmitted to the CODECs 2-1 to 2-N. Time slots of the receiving and transmitting frames are allocated to conferees (channels) in the same order. For example, the time slot of the PCM words $A_1$ in the receiving frame and the time slot of the PCM word $\alpha_1$ in the transmitting frame are allocated to the same channel. Each time slot of the receiving frame is further divided into $n$ sub-time slots ST in which the number of the time slots $n$ is equal to that of the channels $n$ in the receiving frame. The sub-time slots ST are assigned channels in the same order as the time slots in either the receiving or transmitting frame. For instance, the first sub-time slot of each time slot in the receiving frame is allocated to the channel of the PCM words $A_1$ and $\alpha_1$. A conferee indication signal S (FIG. 3C) is a pulse signal to indicate the combination of conferees or the participants of the conference. For instance, in FIG. 3A, the signal S should have pulses in the fourth and fifth sub-time slots of the time slot 1 or the sub-time slots corresponding to the positions of the conferees $A_2$ and $A_3$ in the receiving frame, in order that the conferee $A_1$ may obtain PCM words of conferees $A_2$ and $A_3$. In order that the conferee $A_2$ in the time slot 4 may obtain the PCM words of the conferees $A_1$ and $A_3$, the signal S should have pulses in the first and fifth sub-time slots which correspond to the conferees $A_1$ and $A_3$. The clock signal 1 (FIG. 3G) is a clock signal having the same repetition period as the sub-time slot while the signal V (FIG. 3E) is a signal indicating either the receiving frame or transmitting frame which herein indicates the receiving frame at the level "1".

Referring to FIGS. 3A to 3H and 4A to 4H, during the time slot 1, the gate 6 responds to the conference indication signal S (FIG. 3C) and takes the PCM words $A_1$ out of the input multiplexed PCM signal W (FIG. 3B) at the fourth and fifth sub-time slots and supplies them as the addition signal X (FIG. 3D) to the adder 10b. Because no signal has been inputted in the shift register 8, the shift register 8 supplies "0" to the adder 10b (FIG. 3H). As a result, the adder 10 feeds the PCM words $A_1$ as a signal U (FIG. 3F) to the shift register 8 via the gate 7. The AND gate 7 feeds the output from the adder 10b to the shift register 8 at the "0" level of the signal V (FIG. 3E) indicative of the receiving frame.

During the time slots 2 and 3, the gate 6 takes the PCM words $B_1$ and $B_2$ out of the multiplexed PCM signal W and supplies the same to the adder 10, respectively.

During the subsequent time slot 4, the gate 6 takes the PCM words $A_2$ during the first and fifth sub-time slots and supplies each to the adder 10, respectively. As the shift register 8 is to supply the PCM word $A_1$ to the adder 10b during the fifth sub-time slot, the adder 10b supplies the sum of the PCM words $A_2$ and $A_1$ or ($A_1+A_2$) to the shift register 8 as the PCM word $\alpha_1$.

During the time slot 5, the gate 6 takes the PCM words $A_3$ during the first and fourth sub-time slot, respectively, and feeds them to the adder 10b. At the first sub-time slot, the adder 10b calculates the sum ($\alpha_2$) of the PCM word $A_2$ fed from the shift register 8 and the PCM word $A_3$ or ($A_2+A_3$). Meanwhile, at the fourth sub-time slot, the adder 10b operates to produce the sum ($\alpha_3$) of the PCM word $A_3$ and the PCM word $A_1$ supplied from the shift register 8. The sum of the PCM words $\alpha_2$ and $\alpha_3$ are, in responsive to the clock signal 1 (FIG. 4G), sequentially read out from the shift register 8. In response to the change in the signal V to "1" (FIG. 4E), the shift register output is transmitted through the gate 5 to the CODECs (FIG. 4B). During the transmission, the conferee indication signal S is kept at "0" (FIG. 4C).

Referring to FIG. 5, the conferee indication signal generator 10 includes three shift registers 13 through 15 provided in a one-to-one correspondence to three conferences. The shift registers 13 to 15 are loaded with the content of the switch board shown in FIG. 6. The switch board indicates the relation between the conferences No. A through C and the channels or conferees 1 to 5 which participate in the respective conferences. In the example shown in FIG. 6, the conferees of the channels 1, 4 and 5 participate in the conference No. A while the conferees of the channels 2 and 3 participate in the conference No. B. The shift register 13 corresponding to the conference No. A is, therefore, loaded with "10011" which indicates the participation of the channels 1, 4 and 5. The above-mentioned signal generator 10 is further equipped with AND gates 19 through 21 for receiving the outputs from the shift registers 13 through 15, shift register 16 through 18 to which the switch board output is loaded to control the gates 19 to 21, and a gate 22 for controlling the combined outputs of the gates 19 to 21 in response to a control signal from a terminal 23.

Referring to FIGS. 7A through 7G, the operation of the signal generator 10 will now be described. The shift registers 13 and 16 are loaded with the signal "10011" indicating the participating channels 1, 4, 5 in the conference A, while the shift registers 14 and 17 are loaded with "01100" indicating the channels which participate in the conference B. As the shift registers 15 and 18 have no channels which participate in the conference C, "0" is loaded into bath. Under this state, when a clock 2 signal (FIG. 7C) is supplied to the shift registers 13 through 15, the contents of the registers 13 through 15 are sequentially read out and fed to one of the terminals of the respective gates 19 through 21. As the shift registers 16 through 18 have been fed with a clock signal 3 (FIG. 7D), the registers 16 through 18 supply a "1" or, "0" at the other terminals of the respective gates 19 through 21. As a result, only the gate 19 corresponding to the conference A is made to open, and the content of the shift register 13 or "10011" is supplied to the gate 22 during the time slot 1. Similarly, during the time slot 2, as "1" appears at the output from the register 17, the gate 20 is made to open and the content of the shift register 14 or "01100" is supplied to the gate 22. The gate 22 is controlled by the control signal fed at the terminal 23 (FIG. 7F), which blocks the retransmission of a PCM work back to its sender, and outputs the conferee indication signal (FIG. 7G).

As described in the foregoing, this invention enables the simplification of the circuit wiring by commonly using one terminal for input and output purposes.

While the preferred embodiment of the invention has been described above, many modifications and alternatives thereto can be made by those skilled in the art within the scope of the invention defined by the appended claims.

What is claimed is:

1. A digital conference circuit for use in a digital telephone system in which each user provides an output in the form of a sequence of PCM signals occuring in predefined time slots, comprising: a source of composite PCM signal obtained by time-multiplexing the PCM signals outputted by users participating in conference calls; first means for generating a conferee indicating signal indicating for each user participating in a conference other users than itself participating in said conference; second means for producing for each of said users participating in a conference a conferee voice signal by extracting from said composite PCM signal, in response to said conferee indicating signal, PCM signals from said other users participating in said conference; third means for time-division multiplexing said conferee voice signals into a single conference voice signal, said third means comprising an adder for summing said conferee voice signals with a partial conference voice signal and shift register means responsive to an output of said adder for producing a shifted output of said output of said adder and feeding back the shifted output to said adder as said partial conference voice signal; and fourth means for transmitting said conference voice signal to all said users participating in a conference.

2. A digital conference circuit as recited in claim 1, wherein said multiplexed signal is time-division multiplexed in a repeating frame of N slots and each of said N slots are subdivided into N sub-slots, each slot being associated with a reception from one of N users, each sub-slot being further associated with a transmission to one of said N users;

wherein said first means generates said conferee indication signal for all of said sub-slots, said first means providing an enabling conferee indication signal in a first sub-slot of a first slot if said first sub-slot and said first slot are associated with different users being conferees at a conference; and wherein said second means produces said conferee voice signal in response to said enabling conferee indication signal.

3. A digital conference circuit as claimed in claim 1 wherein said multiplexed signal is time-division multiplexed in a repeating frame of N slots and each of said N slots are subdivided into N sub-slots, each slot being associated with a reception from one of N users, each sub-slot being further associated with a tranmission to one of said N users;

wherein said first means generates said conferee indication signal for all of said sub-slots, said first means providing an enabling conferee indication signal in a first sub-slot of a first slot if said first sub-slot and said first slot are associated with different users being conferees at a conference; and wherein said second means produces said conferee voice signal in response to said enabling conferee indication signal.

* * * * *

UNITED STATES PATENT AND TRADEMARK OFFICE
CERTIFICATE OF CORRECTION

PATENT NO. : 4,719,618

DATED : January 12, 1988

INVENTOR(S) : ITOH et al.

It is certified that error appears in the above-identified patent and that said Letters Patent is hereby corrected as shown below:

COLUMN 2, LINE 12   Delete "gates" and insert --gated--

COLUMN 4, LINE 29   Delete "work" and insert --word--

Signed and Sealed this

Twenty-third Day of August, 1988

Attest:

DONALD J. QUIGG

Attesting Officer

Commissioner of Patents and Trademarks